(12) United States Patent  (10) Patent No.: US 8,162,297 B2
Norris et al.  (45) Date of Patent: Apr. 24, 2012

(54) DIVERSE BUBBLE SIZE GENERATION

(75) Inventors: Michael W. Norris, Cypress, TX (US);
Steven E. Heiney, Houston, TX (US);
Warren S. Ross, Houston, TX (US);
Marvin L. Johnson, The Woodlands, TX (US)

(73) Assignee: ExxonMobil Upstream Research Co., Houston, TX (US)

( * ) Notice: Subject to any disclaimer, the term of this patent is extended or adjusted under 35 U.S.C. 154(b) by 673 days.

(21) Appl. No.: 12/303,534

(22) PCT Filed: May 9, 2007

(86) PCT No.: PCT/US2007/011172
§ 371 (c)(1),
(2), (4) Date: Dec. 4, 2008

(87) PCT Pub. No.: WO2008/005101
PCT Pub. Date: Jan. 10, 2008

(65) Prior Publication Data
US 2009/0188672 A1  Jul. 30, 2009

Related U.S. Application Data

(60) Provisional application No. 60/818,990, filed on Jul. 6, 2006.

(51) Int. Cl.
*B01F 3/04*  (2006.01)
(52) U.S. Cl. .......... 261/122.1; 261/124; 367/15; 367/24
(58) Field of Classification Search .............. 261/122.1, 261/123, 124; 367/15, 24; 702/13, 14
See application file for complete search history.

(56) References Cited

U.S. PATENT DOCUMENTS

| | | | |
|---|---|---|---|
| 2,954,090 | A | 9/1960 | Burg et al. |
| 3,396,950 | A | 8/1968 | Wood |
| 3,970,731 | A | 7/1976 | Oksman |
| 4,557,879 | A | 12/1985 | Weber |
| 4,618,024 | A | 10/1986 | Domenico |
| 4,625,302 | A | 11/1986 | Clark |
| 4,632,213 | A | 12/1986 | Domenico |
| 5,117,882 | A | 6/1992 | Stanford |
| 5,613,456 | A | 3/1997 | Kuklinski |
| 5,959,938 | A | 9/1999 | Behrens |
| 5,992,104 | A | 11/1999 | Hudak |
| 6,089,345 | A | 7/2000 | Meynier et al. |
| 6,356,816 | B1 | 3/2002 | Katz |
| 6,606,278 | B2 | 8/2003 | Lee et al. |

(Continued)

FOREIGN PATENT DOCUMENTS

| JP | 2003 088736 | 3/2003 |
|---|---|---|
| WO | WO 97/20233 | 6/1997 |

OTHER PUBLICATIONS

EP Search Report RS 114224 dated Nov. 16, 2006.

(Continued)

*Primary Examiner* — Charles Bushey
(74) *Attorney, Agent, or Firm* — ExxonMobil Upstream Research Co.

(57) ABSTRACT

Method and apparatus for producing a bubble curtain with a diversity of bubble diameters for purposes such as suppressing surface-related multiple reflections in marine seismic surveys. Bubble generating elements are used that combine porous wall material with discrete holes.

18 Claims, 5 Drawing Sheets

U.S. PATENT DOCUMENTS

| | | | |
|---|---|---|---|
| 6,982,926 | B2 | 1/2006 | Tenghamn et al. |
| 2002/0114218 | A1 | 8/2002 | Lee et al. |
| 2003/0038386 | A1 | 2/2003 | Parayre et al. |
| 2004/0240318 | A1 | 12/2004 | Drake et al. |
| 2005/0270901 | A1* | 12/2005 | Swanson ......................... 367/15 |

OTHER PUBLICATIONS

PCT International Search & Written Opinion dated Aug. 13, 2008, 7 pages.

Domenico, (1982) "Acoustic wave propagation in air-bubble curtains in water—Part I: History and Theory," *Geophysics* v.47, pp. 345-353.

Domenico, (1982) "Acoustic wave propagation in air-bubble curtains in water—Part II: Field Experiment," *Geophysics* v.47, pp. 354-375.

Ross et al. (2005) "Mitigating seismic noise with an acoustic blanket—the promise and the challenge," *The Leading Edge* v.24, pp. 303-313.

Sixma et al. (1996), "Air Bubble Screen Noise Suppression Test in Lake Maracaibo," Congresso Venezolano de Geofiscia.

\* cited by examiner

DIVERSE BUBBLE SIZE GENERATION

This application is a National Stage entry under 35 U.S.C. 371 of PCT/US2007/011172 that published as WO 2008/005101 and was filed on May 9, 2007 and claims the benefit of U.S. Provisional application 60/818,990 which was filed on Jul. 6, 2006.

FIELD OF THE INVENTION

This invention relates generally to the field of geophysical prospecting, and more particularly to seismic data acquisition in water covered areas. Specifically, this invention is a method for altering the physical characteristics of the fluid medium over an increased range by generating bubbles with a broad distribution of sizes.

BACKGROUND OF THE INVENTION

Injecting small amounts of a gaseous material into a liquid medium is a well known method for altering the physical characteristics of the liquid medium. Three applications where this technique is utilized are: (1) protection of underwater objects as described in U.S. Pat. No. 5,992,104 to Hudak; (2) drag reduction as described in U.S. Pat. No. 5,117,882 to Stanford), No. 5,613,456 to Kuklinski, No. 6,356,816 to Katz, and No. 6,982,926 to Tenghamn; and (3) modifying transmitted and received seismic signals as described by U.S. Pat. No. 2,954,090 to Burg, No. 4,618,024 and No. 4,632,213 to Domenico, No. 4,625,302 to Clark, No. 5,959,938 to Behrens and No. 6,606,278 to Lee. The last publication is of particular interest because it provides a means to simplify the recorded seismic data and to alter the inherent signature of a marine energy source.

Injecting small amounts, typically less than a few percent by volume, of gaseous material into a liquid medium dramatically increases the effective compressibility with a corresponding reduction in the acoustic velocity of the fluid-gas mixture. As taught by Domenico and others, when acoustic waves impinge on and pass through a liquid medium containing gaseous bubbles, a complex system of energy reflection, refraction and attenuation is created. The response of the seismic wave to a gaseous mixture is frequency dependent and is principally a function of the percentage volume taken up by the gaseous material, the thickness of the gaseous zone and the size of the gaseous bubbles. These references teach creating bubble layers that shield the air-water surface from direct and indirect seismic source energy, thus preventing surface reflections that would contribute noise at receivers in a marine seismic survey, or the bubble layers alter the surface reflection in a geophysically significant manner so as to improve the signal-to-noise ratio seen at the receivers.

To create inhomogeneous regions in the water column, Burg, Domenico, Clark and Behrens utilized discrete holes or nozzles with a single or a few hole diameters. Depending on the orientation, air-bubble volume percent or intended use, the shape of the inhomogeneous region has been referred to as a bubble curtain or an acoustic blanket or an acoustic lens. In practice, the shapes are used to reflect, refract and/or attenuate seismic energy generated by marine energy sources. Lee also builds inhomogeneous regions in the water column; but he creates the inhomogeneous regions using microbubbles created with porous wall tubing.

For drag reduction, Tenghamn makes use of discrete holes or perforations. Stanford, Kuklinski and Katz utilize microbubbles to reduce drag caused at the turbulent boundary layer. In addition Katz, references the use of slider plates to achieve variable bubble sizes.

For both the seismic signal modification application and the drag reduction application, the range of bubble sizes is limited to a fairly narrow range by the bubble production mechanism. Bubble generation mechanisms such as metal fibers structures, sintered powder metal, ceramic stones and porous plastics and rubber structures have effective pore sizes less than 200 to 400 microns. These types of mechanical systems are used to generate what are generally termed microbubbles. Discrete holes, typically greater than 200 microns in diameter, create larger bubbles. For both of these bubble generation techniques, the size of the bubbles can be altered by the hole spacing, fluid flow at the bubble generation site, the effective surface tension during bubble generation and the differential pressure between the gaseous region and the fluid region. For the seismic application, it is advantageous to have a broad range of bubble sizes so as to affect a broad frequency range. A diversity of bubble sizes also increases the range of bubble rise rates, which adds to the complexity of the bubble field.

Other related references include:
Domenico, "Acoustic wave propagation in air-bubble curtains in water—Part I: History and theory," *Geophysics* 47, 345-353 (1982);
Domenico, "Acoustic wave propagation in air-bubble curtains in water—Part II: field Experiment: *Geophysics* 47, 354-375 (1982);
Sixma and Stubbs, "Air Bubble Screen Noise Suppression Test in Lake Maracaibo," Congresso Venezolano de Geofisica (1996);
Ross et al., "Mitigating seismic noise with an acoustic blanket—the promise and the challenge," *The Leading Edge* 24, 303-313 (2005).

SUMMARY OF THE INVENTION

In one embodiment, the invention is a method for generating bubble fields with a diversity of bubble sizes, comprising:
(a) constructing a bubble generator that combines porous wall material with wall material containing one or more discrete holes (see step 91 in the flow chart of FIG. 9); and
(b) connecting the bubble generator to a source of pressurized gaseous fluid, and immersing the bubble generator in water (step 92).

The bubble generator wall material may be a combination of porous wall material and non-porous wall material, where the non-porous wall material contains one or more discrete holes. Alternatively, discrete holes may be made in porous wall material.

A device suitable for step (a) above for making a diverse-size bubble curtain for a large scale application, such as to suppress surface-related multiple reflections in marine seismic surveys, comprises:
(a) a frame;
(b) a plurality of bubble diffuser elements attached to the frame, said diffuser elements enclosing hollow chambers with walls designed to leak pressure by virtue of a combination of porous wall material and one or more discrete holes; and
(c) a tube connected to the chamber in every diffuser element, said tube being adapted to be connected to a pressurized source of gaseous fluid.

The bubble generator of the present invention may have many shapes. The shape is not what distinguishes the invention. The critical feature is the wall construction used for the hollow chamber or chambers that are adapted to be connected to a source of pressurized gas such as air, particularly in regard to how the walls are made not to be air tight. Other structural features and specific construction materials may vary.

BRIEF DESCRIPTION OF THE DRAWINGS

The present invention and its advantages will be better understood by referring to the following detailed description and the attached drawings and photographs in which.

Figure 1A:
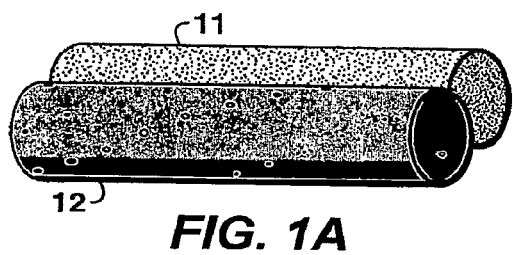
FIGS. 1A-C illustrate different ways to combine discrete holes/perforations and porous wall material, according to the present invention.

The invention will be described in connection with its preferred embodiments. However, to the extent that the following description is specific to a particular embodiment or a particular use of the invention, this is intended to be illustrative only, and is not to be construed as limiting the scope of the invention. On the contrary, it is intended to cover all alternatives, modifications and equivalents that may be included within the spirit and scope of the invention, as defined by the appended claims.

DETAILED DESCRIPTION OF THE PREFERRED EMBODIMENTS

Traditionally bubble fields have been generated using one of two techniques. The first technique is to drill a discrete hole in a non-porous material. Electro-discharge Machines, EDMs, have been used to drill holes with diameters as small as 22 microns and laser drills can drill holes with diameters on the order of 150 microns. The smallest conventional ANSI drill bit is a #80 which has a diameter of 342.9 microns.

The second technique is to generate a porous material which allows the passage of gaseous material. As noted previously, porous materials can be generated in a number of ways. Porous metal structures are created from powdered metals or fine metal fibers. These materials are formed into a shape and sintered (sintered—to cause to become a coherent mass by heating without melting). In a similar manner alumina and silica powders can be sintered to generate porous ceramic structures. Larger pore ceramic or porous rock devices can be generated by increasing the grain size of the base materials. These types of porous materials can have effective pore diameters from submicron size to a hundred or more microns.

As stated previously, there is a range of overlap between the hole diameters generated by the two bubble generation techniques. However, the two techniques are distinguished by more than the size of the holes. Discrete drilled holes provide individual bubbles or bubble fountains depending on the diameter of the hole and the differential pressure applied across the hole. At very low differential pressures, individual bubbles are created at or near the surface of the material/liquid. As the differential pressure is increased, a fountain effect moves bubble generation away from the surface of the material. The interaction between discrete holes driven with high differential pressures and/or flow of the liquid can create complex bubble fields. Another principle difference between the bubble generation techniques is the range of hole diameters. For discrete holes in rigid materials, the range of hole diameters is limited by the nominal diameters of the drilling technique used and the machining tolerances. Although porous materials are quite often quoted as having a pore (i.e. a hole) diameter, the reality is that porous materials have a distribution of pore diameters. The distribution of pore sizes is a function of the distribution of the base materials the porous material is made from and the manufacturing technique used to create the porous material. Unlike discrete holes, porous materials tend to generate bubbles at all points along the material/liquid interface with the bubbles being generated at or very near the material/liquid interface regardless of the differential pressure applied. These features of porous materials can be used, according to the present invention, to infill the bubble field between discrete holes and generate bubbles with a range of small diameters. These small bubbles combined with the larger bubbles created using discrete holes provide a large diversity of bubble diameters. As previous mentioned, a large diversity of bubble diameters extends the frequency range over which a bubble filled zone can, for example, affect seismic signals.

Figure 1C:
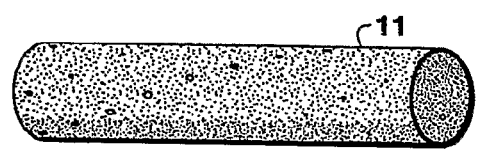
Figure 1B:
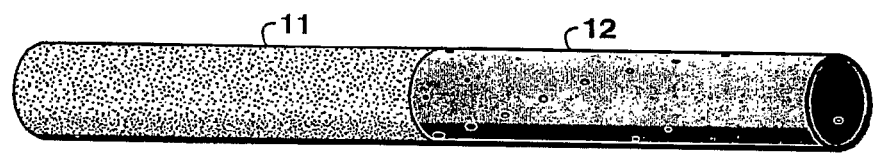

The present invention is a method for making a bubble generator by combining porous wall materials and discrete holes to create a bubble field with a diverse range of bubble sizes. Increasing the range of bubble sizes increases the frequency range over which the bubble field can alter the characteristic of seismic signals. FIGS. 1A-C show three potential means to create this type of bubble generator. In one embodiment of the invention, a tubing with porous walls is used to create microbubbles and a non-porous wall tubing with discrete holes, perforations or nozzles is used to create larger more discrete bubbles. The porous wall material preferably has effective pore diameters less than 400 microns and more preferably in the 50 to 200 micron range. The effective diameter of the discrete holes is preferably greater than 300 microns and more preferably on the order of 1000 to 2000 microns. The effective diameter of a discrete hole will normally not be the same as the diameter of the drill or punch used to create the discrete hole. Roughness of the hole's surface and lip and the curvature of the material affects the effective hole diameter.

A two-tube bubble generation arrangement is shown in FIG. 1A. An advantage to this arrangement is that it allows the air flow and air pressure to be different in the porous 11 and non-porous 12 portions of the bubble generator. A variation on this dual material embodiment is shown in FIG. 1B where segments of porous wall tubing 11 and non-porous wall tubing 12 are interspersed to create a single tubing element. Both of these approaches are workable embodiments, but the first requires significantly more material and fittings and the second is significantly more complex to fabricate. FIG. 1C is a preferred embodiment wherein discrete holes, perforations or nozzles are directly applied to a porous wall tube rather than to a non-porous wall tube as in FIGS. 1A and 1B. As depicted in the drawings, the diameter and shape of the holes can vary and are application dependent. Additionally degrees of freedom are provided by the spacing, number, orientation, patterning and fabrication method (i.e. drilled holes, perforations or nozzles) of the holes. For illustrative purposes, the porous and non-porous components are depicted in FIGS. 1A-C as tubular products, suggesting hoses. It will be apparent to the trained reader that the present inventive method of creating bubble fields using porous material and discrete holes can be implemented using other types of porous materials (e.g. ceramics, fiber metal plates, powdered metals, etc.) and other physical configurations (e.g. plates, square tubulars, etc.).

There are many manufacturers of porous products that, while not specifically advertised for bubble making, could be adapted for that purpose. Examples of products capable of having pore sizes ranging from <1 micron up to 100-150 microns include the sintered metal fiber products made by Martin Kurz & Co., Inc (nutechservices.com/mki). Applied Porous Technologies, Inc. makes sintered metal powder (appliedporous.com). HP Technical Ceramics makes porous ceramic products (tech-ceramics.co.uk). Alita Industries Inc makes HDPE porous tubes (alita.com/diffuser/polyethylene.php). International Polymer Engineering makes PTFE tubing (ipeweb.com/index.htm). Accumet Materials Co. makes porous zirconium plates (accumetmaterials.com). A design engineer will be able to start with material such as these, and develop a bubble diffuser suitable for the intended application. Engineering issues would include flow impedance, flow capacity, mechanical stability and cost.

Figure 2:
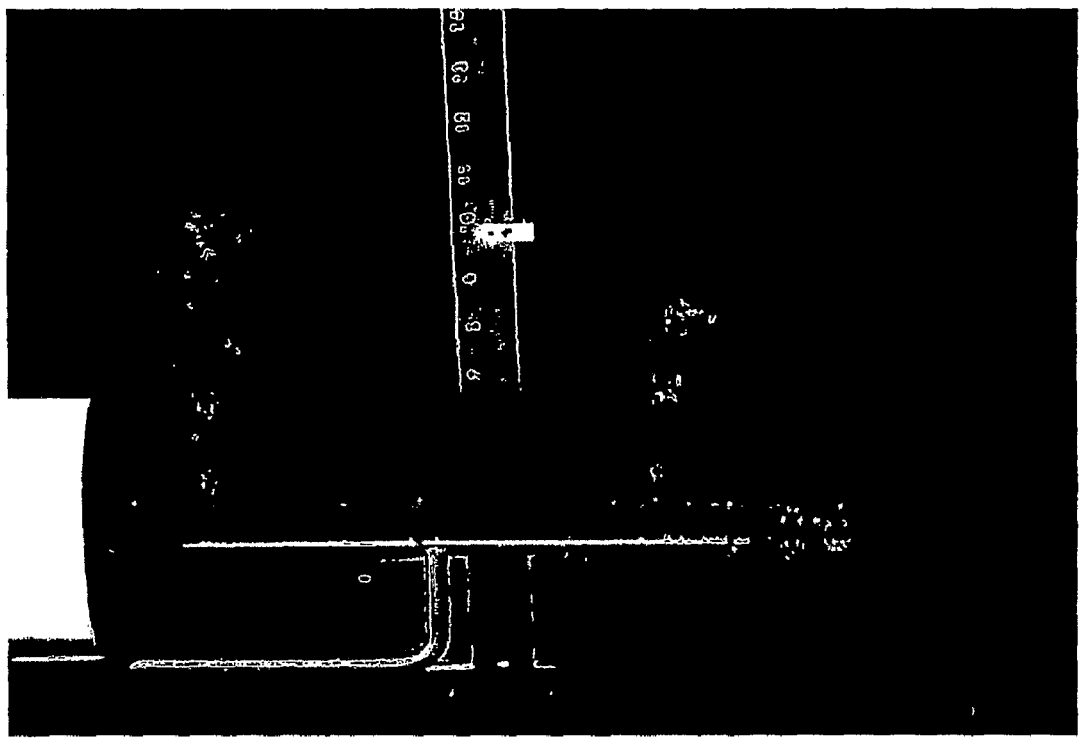
FIG. 2 is a photograph of a tank test of porous wall tubing with two discrete 1/16" holes using a differential air pressure less than 2 psi and no water flow.
Figure 3:
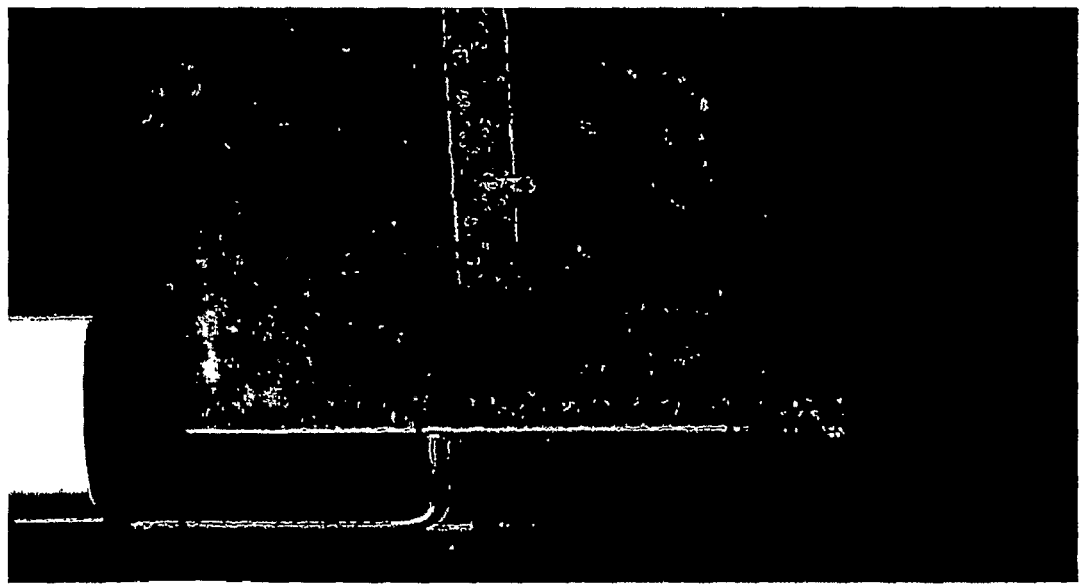
FIG. 3 shows the same tank test as FIG. 2 except the differential air pressure has been increased to 10 psi.
Figure 4:
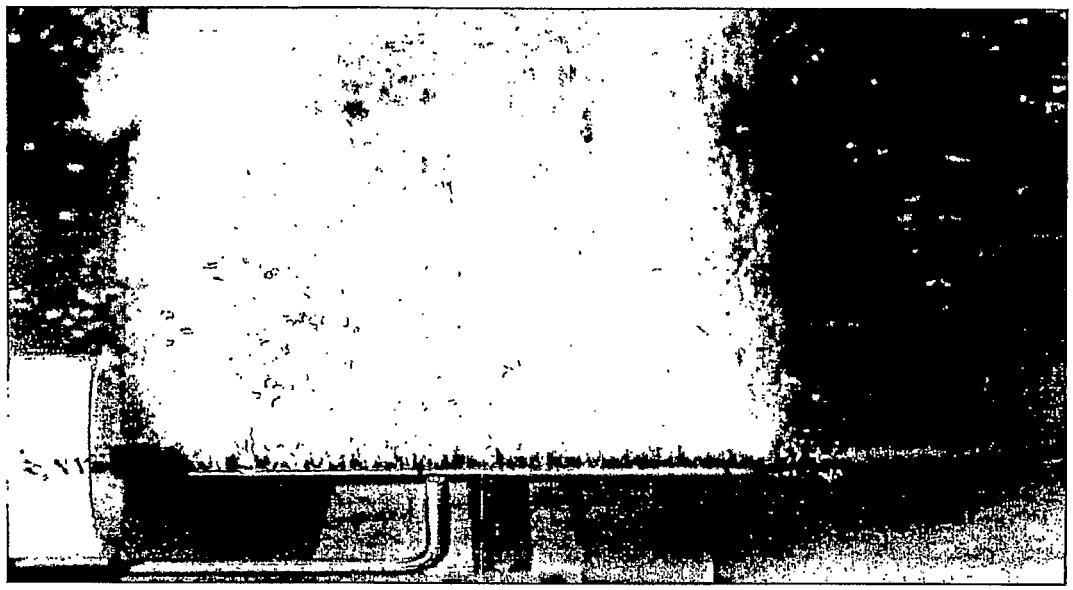
FIG. 4 shows the same tank test as FIG. 2 except the differential air pressure has been increased to 50 psi.
Figure 5:
FIG. 5 shows the tank test of FIG. 4 with the addition of water flow.

The pictures labeled FIG. 2 through FIG. 5 are from a tank test using a bubble generator of the type shown in FIG. 1C. A short segment of a porous wall hose was tested using two, discrete, —1/16" holes. The large diameter, white PVC pipe visible in the bottom left of each photograph provided water flow when desired, and the tubing that can be seen emerging from it is the bubble generating hose. Air was supplied to the test specimen bubble generator via the hose that can be seen exiting the right hand side of each photograph. Following the air hose to the left in the photographs, a pair of hose clamps can be seen where a metal tube connector is used to connect the air hose to the bubble generating hose. In FIGS. 2-4, the air pressure was progressively increased from less than two psi to ten psi and then to fifty psi, with no water flowing. At low pressure, the diversity of bubble size is clearly evident from the extremely fine bubbles emitted through the porous wall to the significantly larger bubbles created by the discrete holes. As the air pressure is increased, the discrete holes move toward a more jet like action and the bubble field between the jets becomes more pronounced. At fifty psi, the bubble field is starting to become non-uniform and bubbles are coalescing. When water flow is added at 50 psi air pressure, as shown in FIG. 5, the bubble field becomes highly non-uniform and exhibits a broad range of bubble sizes. As also indicated by FIG. 5, the bubble field becomes more complex at the boundary between the flowing and still water (where buoyancy dominates over flow, slightly above the top of the PVC pipe in the photograph). This illustrates a feature of the present inventive method, that of deliberately varying the fluid flow characteristics of the fluid flowing past the hose in order to increase the diversity of bubble sizes.

Figure 6:
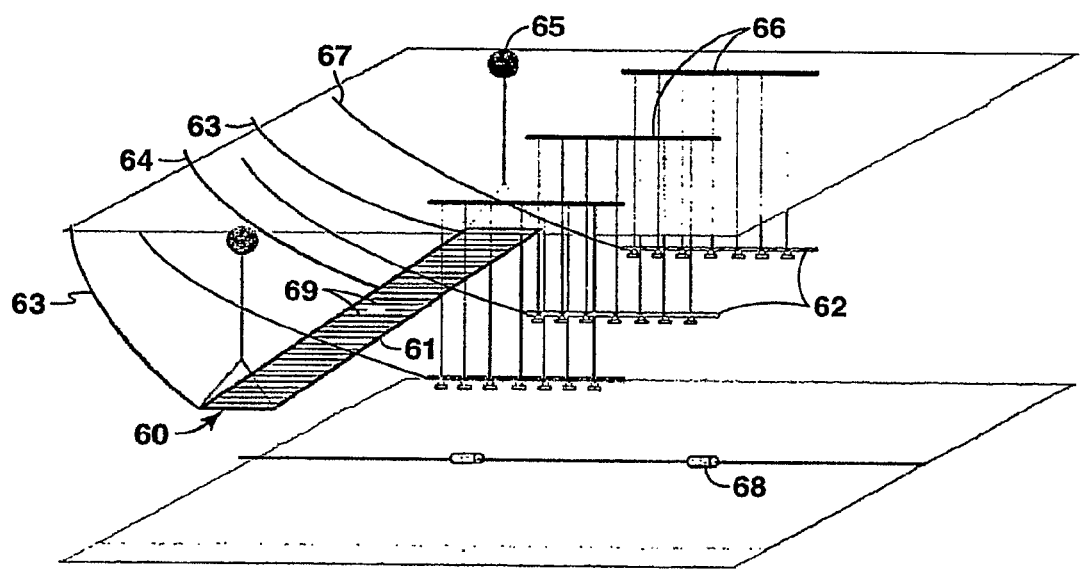
FIG. 6 is a schematic diagram showing how a bubble generator according to the present invention can be used to create an acoustic blanket of bubbles above an air gun array.
Figure 7:
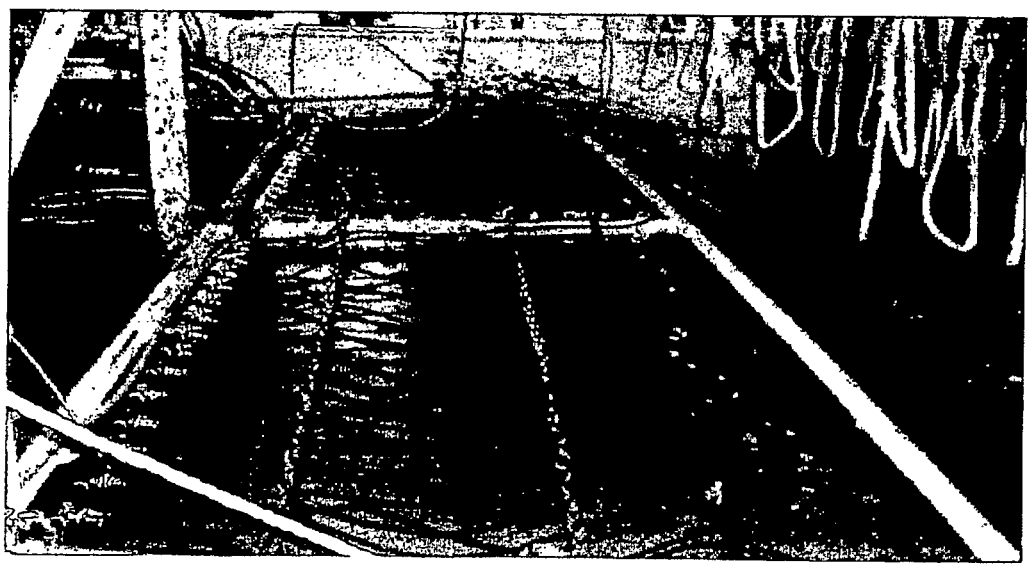
FIG. 7 is a photograph of a bubble generator according to the present invention.

FIG. 6 is a schematic diagram showing a large scale use of a bubble generator based on the embodiment shown in FIG. 1C. In this case, the bubble generator 60 consists of a frame 61 holding many tubes 69 of the type shown in FIG. 1C. A hose 64 supplies air to the bubble generator which creates a bubble field, i.e. an acoustic blanket (not shown), over an air gun array consisting of three strings 62 of air guns. Each air gun string has an air supply hose 67 and is supported by a surface float 66. The bubble generator, supported by surface floats 65, is towed by tow ropes 63 some distance in front of the air gun strings to allow the bubble field to develop in the water column above the air guns. The bubble generator used in the field test is shown in the photograph of FIG. 7. Each of the small black hoses is a porous wall hose with discrete holes. The porous hose used in the apparatus of FIG. 7 (and in FIGS. 1A-C) was purchased from Point Four Systems, Inc. (pointfour.com), 13720 Mayfield Place, #100, Richmond, British Columbia, Canada V6V 2E4. In the particular embodiment of FIG. 7, the frame was 8 m wide and 2 m deep. The 8-m segments and the center 2-m segment served as structural elements only. The 2-m segments on each end were large diameter pipes to act as air reservoirs. Two air hoses were run from the surface vessel to the 2-m segments, one air hose to each outside 2-m segment. Two one-inch manifolds were constructed to supply air to the porous hoses. Each manifold extended across the 8-m width of the bubbler frame and each 1-in manifold was connected to a 2-m reservoir segment. Two manifolds were used to allow 20 to 30 cm spacing for the porous hoses and to provide redundancy.

Figure 8:
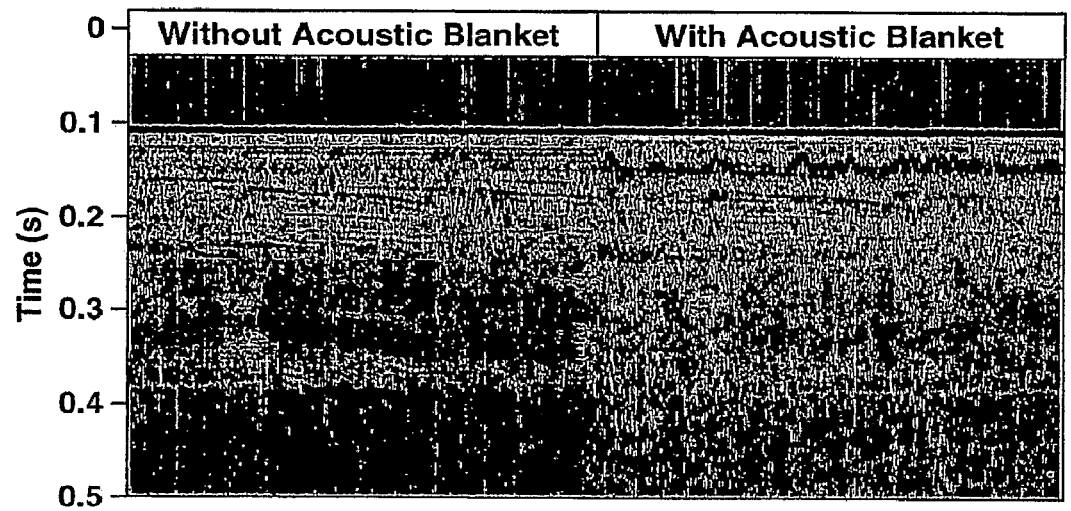
FIG. 8 is a display of vertical accelerometer data for the nearest source point along a 2D seismic line, comparing data taken with an acoustic blanket according to the present invention to data acquired with no acoustic blanket.
Figure 9:
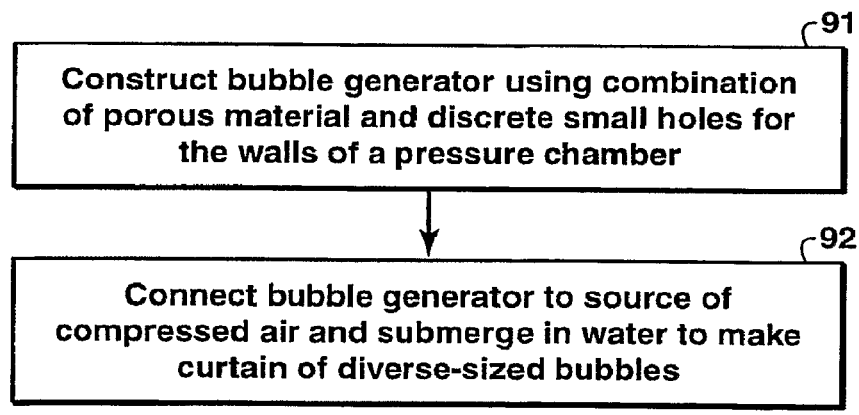
FIG. 9 is a flow chart of basic steps in one embodiment of the present inventive method.

The effect of this apparatus on the air gun signature is shown in FIG. 8. The data in this display were recorded on an ocean bottom cable ("OBC") acquisition system such as indicated at 68 in FIG. 6. FIG. 8 shows seismic data traces recorded on vertically oriented accelerometers. The traces were generated by a full air gun array with the shot nearest each receiver station being displayed. For this receiver line, the water depth varied from 35 to 48 m. The left and right sides of FIG. 8 contain the same receiver station and use the same source array. The traces on the left side used only the source array and the traces on the right side use the source array and an acoustic blanket above the source array. Each trace was corrected for the slant range from the center of the source array to the receiver. Assuming a reasonably correct water velocity is used, this correction flattens signals associated with the source signature, but geological effects will not be flattened. It is clear from FIG. 8 that the bubble field has modified the acoustic signature emitted from the combined effect of the air gun array and the air-water interface. The vertical axis in FIG. 8 represents time in seconds measured relative to the initial pulse of the air gun, and thus represents depth. Looking at FIG. 8 at a time between approximately 110 and 130 ms, one can see prominent structure (vertical peaks) on the right side of the display, but on the left side those features are mostly obscured by dark horizontal bands. The interpretation is that the 110-130 ms event is near surface geology and the horizontal events that obscure this information of interest are reverberations (in the form of a high-frequency reverse-polarity pulse) associated with the surface ghost. The ghost response from the air-water interface has been removed with the acoustic blanket, simplifying the effective source signature.

The foregoing application is directed to particular embodiments of the present invention for the purpose of illustrating it. It will be apparent, however, to one skilled in the art, that many modifications and variations to the embodiments described herein are possible. All such modifications and variations are intended to be within the scope of the present invention, as defined in the appended claims.

The invention claimed is:

1. A method generating bubble fields with a diversity of bubble sizes to suppress surface reflection noise in a marine seismic survey, comprising:
   (a) obtaining a bubble generator having a diffuser element that combines porous wall material with wall material containing one or more discrete holes;
   (b) connecting the bubble generator to a source of pressurized gaseous fluid; and
   (c) towing the bubble generator along with one or more seismic sources through a body of water with the bubble generator positioned such that emitted bubbles create a bubble field preventing seismic reflections from the water body's air-water surface, which reflections would contribute noise at the survey's receivers or modify the survey's source signature due to surface ghost response.

2. The method of claim 1, wherein the discrete holes are perforations in the wall material.

3. The method of claim 1, wherein the discrete holes are made using a punch, drill or laser beam.

4. The method of claim 1, wherein the discrete holes are greater than about 300 microns in effective diameter.

5. The method of claim 4, wherein the discrete holes are between about 1,000 and 2,000 microns in effective diameter.

6. The method of claim 1, wherein pores in the porous wall material have effective diameter less than about 400 microns.

7. The method of claim 1, wherein pores in the porous wall material have effective diameter between about 50 microns and about 200 microns.

8. The method of claim 1, further comprising a nozzle connected to a discrete hole for at least one of the discrete holes.

9. The method of claim 1, further comprising altering the characteristics of the bubble field generated by changing the number, shape, size, orientation, pattern, roughness or distribution of the discrete holes.

10. The method of claim 1, further comprising connecting the bubble generator to a fluid flow source.

11. The method of claim 1, further comprising shielding the bubble generator from any fluid flow that may exist in the water that the bubble generator is immersed in.

12. The method of claim 1, wherein the gaseous fluid is air.

13. The method of claim 1, wherein characteristics of the bubble field generated by the immersed bubble generator are altered by adjusting flow rate of the gaseous material.

14. The method of claim 1, wherein characteristics of the bubble field generated by the immersed bubble generator are altered by adjusting the pressure of the gaseous material.

15. The method of claim 10, wherein characteristics of the bubble field generated by the immersed bubble generator are altered by adjusting flow rate of the fluid flow source.

16. The method of claim 1, further comprising varying a characteristic of fluid flowing past the immersed bubble generator in order to further increase the diversity of bubble sizes.

17. The method of claim 1, wherein all wall material is porous wall material that contains one or more discrete holes.

18. The method of claim 1, wherein the pores and discrete holes are distributed in size over a range from effective pore diameter of 100 microns or less to discrete hole diameter of 1,000 microns or more.

* * * * *